(12) United States Patent
Taheri et al.

(10) Patent No.: US 12,444,973 B2
(45) Date of Patent: Oct. 14, 2025

(54) ENERGY DISAGGREGATION METHODS AND SYSTEMS USING WEATHER DATA

(71) Applicant: Arbnco Ltd, Glasgow (GB)

(72) Inventors: Mahnameh Taheri, Glasgow (GB); Colin Parry, Glasgow (GB); Alan Wegienka, Glasgow (GB); Loic Jacob, Glasgow (GB)

(73) Assignee: Arbnco Ltd, Glasgow (GB)

( * ) Notice: Subject to any disclaimer, the term of this patent is extended or adjusted under 35 U.S.C. 154(b) by 237 days.

(21) Appl. No.: 18/007,465

(22) PCT Filed: Jul. 28, 2021

(86) PCT No.: PCT/EP2021/071226
§ 371 (c)(1),
(2) Date: Jan. 30, 2023

(87) PCT Pub. No.: WO2022/023455
PCT Pub. Date: Feb. 3, 2022

(65) Prior Publication Data
US 2023/0299611 A1 Sep. 21, 2023

(30) Foreign Application Priority Data
Jul. 28, 2020 (GB) .................... 2011663

(51) Int. Cl.
*H02J 13/00* (2006.01)
(52) U.S. Cl.
CPC .. *H02J 13/00001* (2020.01); *H02J 13/00004* (2020.01); *H02J 2310/60* (2020.01); *H02J 2310/62* (2020.01)
(58) Field of Classification Search
CPC .... G06Q 50/06; G01D 2204/24; G05B 15/02; G05B 2219/2642; G05B 13/02; G05B 19/042
See application file for complete search history.

(56) References Cited

U.S. PATENT DOCUMENTS

| | | | |
|---|---|---|---|
| 10,460,274 B2 | 10/2019 | He | |
| 2011/0282506 A1* | 11/2011 | Amram | G06Q 50/06 700/291 |

(Continued)

FOREIGN PATENT DOCUMENTS

WO 2014092946 6/2014

OTHER PUBLICATIONS

Rahman, Imran, Murat Kuzlu, and Saifur Rahman. "Power disaggregation of combined HVAC loads using supervised machine learning algorithms." Energy and Buildings 172 (2018): 57-66.
(Continued)

*Primary Examiner* — Darrin D Dunn
(74) *Attorney, Agent, or Firm* — SLEMAN & LUND LLP

(57) ABSTRACT

The system may have an energy load data interface to receive energy load data originating from energy use sensors for the building; a weather data interface to receive weather data for a location that includes the building; a weather adjustment pre-processor to process the energy load data and the weather data and to determine a weather-dependent energy use component of the energy load data and a weather-independent energy use component of the energy load data; a baseline adjustment pre-processor to process the weather-independent energy use component of the energy load data and determine a baseline energy use component of the energy load data, wherein the baseline adjustment pre-processor is configured to remove the baseline energy use component from the weather-independent energy use component to determine a variable energy use component of the energy load data; and an energy use disaggregator to process the variable energy use component of the energy load data and determine a plurality of time varying load components of the energy load data.

15 Claims, 8 Drawing Sheets

(56) References Cited

U.S. PATENT DOCUMENTS

| | | | |
|---|---|---|---|
| 2012/0101653 A1 | 4/2012 | Tran | |
| 2012/0123995 A1* | 5/2012 | Boot | H02J 13/00004 |
| | | | 706/54 |
| 2012/0136593 A1* | 5/2012 | Donaldson | G01R 31/343 |
| | | | 702/60 |
| 2012/0143536 A1* | 6/2012 | Greaves | G06Q 40/00 |
| | | | 702/60 |
| 2013/0289788 A1* | 10/2013 | Gupta | H02J 3/14 |
| | | | 700/291 |
| 2016/0018835 A1 | 1/2016 | Gaasch | |
| 2019/0044332 A1* | 2/2019 | Saroya | H02J 13/00007 |
| 2019/0214818 A1* | 7/2019 | Finkel | H02J 3/00 |

OTHER PUBLICATIONS

Taheri, Mahnameh, et al. "Benchmarking Building Energy Consumption Using Efficiency Factors." Building Simulation Conference Proceedings, IBPSA. 2019.

\* cited by examiner

ENERGY DISAGGREGATION METHODS AND SYSTEMS USING WEATHER DATA

FIELD OF THE INVENTION

The present invention relates to systems and methods for processing energy load data. In particular, the present invention relates to energy disaggregation. The present invention may be used to improve an energy efficiency of a building, such as a large non-residential building. The present invention may be seen to reside in the field of energy systems engineering.

BACKGROUND OF THE INVENTION

Reducing energy use is a pressing problem for the modern world. Scientific studies show ongoing changes in the global climate. These include rising land and ocean temperatures. The studies indicate that human activity is the leading cause of these changes, in particular the emission of so-called "greenhouse" gases. There is evidence that buildings are a major source of greenhouse gas emissions. For example, buildings are respectively responsible for 46% and 40% of all $CO_2$ emissions in the United Kingdom and United States. In order to address the problem of climate change, energy systems engineers are tasked with developing solutions to reduce building energy consumption and increase building energy efficiency. Solutions are desired that may be applied to both new and existing buildings, e.g. that improve energy efficiency when constructing and retrofitting buildings.

One problem with reducing energy consumption is it is difficult to know where to begin. Through individual studies, energy systems engineers have identified large non-residential properties as being a relatively large consumer of energy. Commercial buildings, such as offices, public buildings and retail outlets, use a lot of power but are difficult to analyse. For example, they often have multiple units with varying tenants and occupants, as well as industrial lighting, heating and air circulation systems. This may be contrasted with residential buildings, which have been more thoroughly investigated, have more predictable use patterns and offer greater scope for fine-grained measurement.

One area of energy systems engineering that is beginning to gain traction in both the home and the workplace is energy load measurement. For example, so-called "smart meters" have seen wide adoption in many buildings. Although specifics vary, energy load sensor systems are fairly easy to install, typically being passively attached to energy conduits that enter the building (such as electricity cables and gas pipelines). Their roll-out has also often been managed and subsidised by utility companies, as they require gross figures of use for accurate billing. However, one problem with this form of energy load measurement is that it tends to only provide a single gross level of energy consumption, such as a number of kilo Watt-hours (e.g., for gas and/or electricity) over time. While suitable for billing purposes, these measurements are difficult for energy systems engineers to use to reduce energy consumption. For example, it is often very difficult to identify causal factors of energy use from the raw data. This means that although energy load data for a building is often available, it often goes unused. Despite many smart meters displaying the gross levels of energy consumption, this has not yet translated into widespread action to make buildings more environmentally friendly.

Given these problems, a number of possible solutions have been suggested.

U.S. Pat. No. 10,460,274B2 describes systems and methods for performing energy disaggregation of a whole-house energy usage waveform. In this publication, the disaggregation of a residential building is based at least in part on the whole-house energy usage profile, training data, and predetermined generic models. An example system includes: a module for pairing impulses identified in the whole-house energy usage waveform to indicate an appliance cycle, pairing impulses with at least one up transition with at least one down transition; a module for bundling impulses that are representative of an appliance cycle; a classification module, which upon determination of a type of appliance associated with bundles, is configured to classify the bundles of transitions in accordance with bundles exhibited by similar appliances with similar characteristics; and utilizing such pairing module and module for bundling to perform energy disaggregation. Graphical user interfaces are also presented for the presentation of such data and the receipt of user-supplied validation and information.

While U.S. Pat. No. 10,460,274B2 offers certain solutions for small scale residential energy load analysis, these solutions are less applicable to larger commercial buildings. For example, within a small home or residence, there are a small number of appliances, with often one of each appliance type (e.g., one fridge, cooker, pool pump etc.). As many domestic appliances of different types have distinct waveform patterns, this simplifies disaggregation and makes it more straightforward to identify use patterns from the energy load data.

Imran Rahman, Murat Kuzlu, and Saifur Rahman, in their paper "Power disaggregation of combined HVAC loads using supervised machine learning algorithms", published in Energy and Buildings, Volume 172, 2018, Pages 57-66, ISSN 0378-7788, describe power disaggregation algorithms that are used to decompose building level power consumption data into individual equipment level power information. In order to ensure energy efficient operation of complex systems, such as commercial buildings, they indicate that a continuous and detailed energy monitoring system is essential. In the paper, the authors present a novel power disaggregation technique, in which a single set of aggregated power usage data of multiple heating, ventilation and air-conditioning (HVAC) systems from a single power meter is disaggregated to identify the operations of individual HVAC units. Parameters, including the combined real and reactive power of compressors and air handlers, are used in addition to the phase currents of both, as well as the true index values representing the combination of active compressors at any given time.

While the approach described in the above paper provides a method to identify the operations of individual HVAC units, it still requires a continuous and detailed energy monitoring system, and requires specific parameters of the HVAC systems, meaning that the approach is difficult to scale to a large variety of commercial buildings.

As well as the above approaches, many alternatives to smart meters have also been proposed. These include plug-level hardware monitors, so-called "smart" appliances that measure energy use, and building-level sensor networks. However, these in turn have seen low adoption in practice-they are often expensive, difficult to adapt to alternating power sources, and require technical expertise to install, configure and use.

It is thus desired to provide methods and systems for the processing of energy load data that helps an aim of reducing energy consumption of large buildings and building complexes. It is further desired to provide a system that does not require expert energy systems engineer knowledge to identify efficiencies to be gained and that allows building controllers to identify non-routine adjustments or changes in building operations without the continued oversight of an highly-skilled engineer.

SUMMARY OF THE INVENTION

Aspects of the present invention are set out in the appended independent claims. Variations of these aspects are set out in the dependent claims.

Further features and advantages of the invention will become apparent from the following description, which is made with reference to the accompanying drawings.

DETAILED DESCRIPTION OF THE INVENTION

Figure 1:
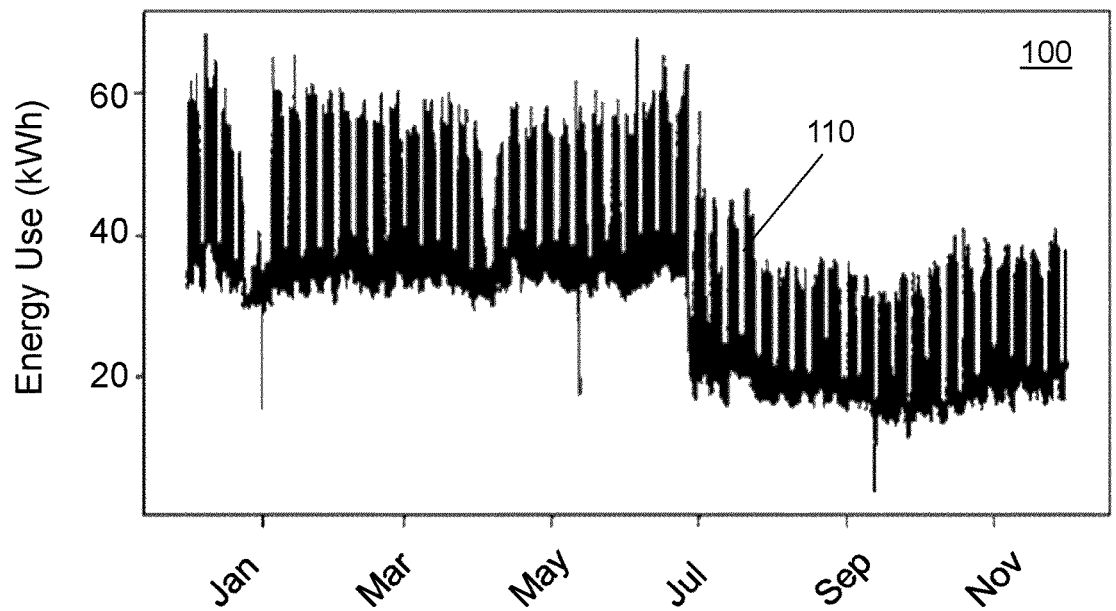
FIG. 1 is a chart showing an example set of energy load data.

Certain examples described herein relate to systems and methods for disaggregating energy load data for a building. In these examples, "energy load data" comprises data that indicates an amount of energy that is used by a building, i.e. the energy "load" on the building. Typically, energy load data is provided as time-series data whereby one or more energy consumption values at different points in time are measured. For example, electrical power or gas consumption may be recorded at predefined time intervals (e.g., every minute, every defined fraction of an hour or hourly) by sensor devices that are mounted within or upon energy conduits that feed the building, such as gas pipelines or electrical power lines. Time-series data may be represented as an n-dimensional array of data, where n is equal to the number of properties being measured (e.g., 1 for electrical power load or 2 for electrical power load and fuel load).

In examples, the energy load data is processed so as to transform the original measurements and identify different components of the energy load data. The examples may be considered a form of signal processing as applied to energy load data. The different components of the energy load data provide information that may be used to reduce energy consumption and/or more efficiently control energy use in the building. By processing the energy use measurements in this way, it may be possible to identify up to double-digit percentage savings in energy use and/or double-digit percentage reductions in wasted energy. This in turn allows for a substantial source of global carbon emissions to be reduced.

In particular, energy load data is typically difficult to process, as it is a gross measure of energy consumption. Within raw energy load data many different factors are integrated in a non-linear manner. For larger non-residual buildings, patterns in the measured data often change over time in ways that make analysis difficult. For example, outdoor weather conditions, user behaviour, and/or changes in use patterns may introduce a wide range of variations in the energy load data. This makes it difficult to compare different time periods within the data and/or compute aggregate measures. Due to these factors, when faced with an increase in raw energy load data values, it may be difficult to know whether this reflects a substantive change in use that warrants further investigation (e.g., as an area where energy consumption may be reduced) or whether it reflects seasonal patterns of use, where the use is already efficient. While the present examples may be applied in both residential and non-residential buildings (e.g., homes and workplaces), they are particularly useful in the second case. This is because non-residential buildings such as shops, offices, factories and public buildings typically consist of units that have a much larger floorspace area than residential buildings, have a greater variety of electrical equipment (including industrial equipment) and are occupied at different times by a larger number of people. This means that energy load data analysis methods that work well within a residential context can fail to provide a benefit for the analysis of energy load data from commercial or non-residential buildings.

FIG. 1 shows an example of energy load data 100 for a year for an office. The energy load data comprises a series of energy use values 110 (plotted as y-axis values) over time (where time is plotted along the x-axis). For example, a reading may be taken from an electricity and/or gas meter every hour, with energy use here being measured in kilo Watt-hours (kWh).

In the examples described herein, a signal processing pipeline is defined that separates raw energy load data into separate components, i.e. that "disaggregates" the raw energy load data. An output of the signal processing pipeline may comprise energy load values for each of the separate components for each data sample; in this manner a single energy use value may be separated into a plurality of energy use values. The present examples provide a particular order of processing operations that allow components to be determined and extracted. As a first stage, pre-processing of the energy load data is performed using weather data. This enables weather-dependent and weather-independent components to be identified. The weather-independent component is then further pre-processed at a second stage to determine a baseline energy use component that represents an underlying constant energy use. The baseline energy use component is removed from the weather-independent component to provide a variable energy use component of the energy load data that may then be disaggregated to determine a plurality of time-varying load components of the energy load data. The result of the signal processing pipeline may be provided as a plurality of different energy load time-series signals.

In certain cases, the examples described herein may be incorporated into a local and/or remote "smart meter" for a building. This modified smart meter is then able to display accurate energy use components for use in reducing energy consumption.

Figure 2:
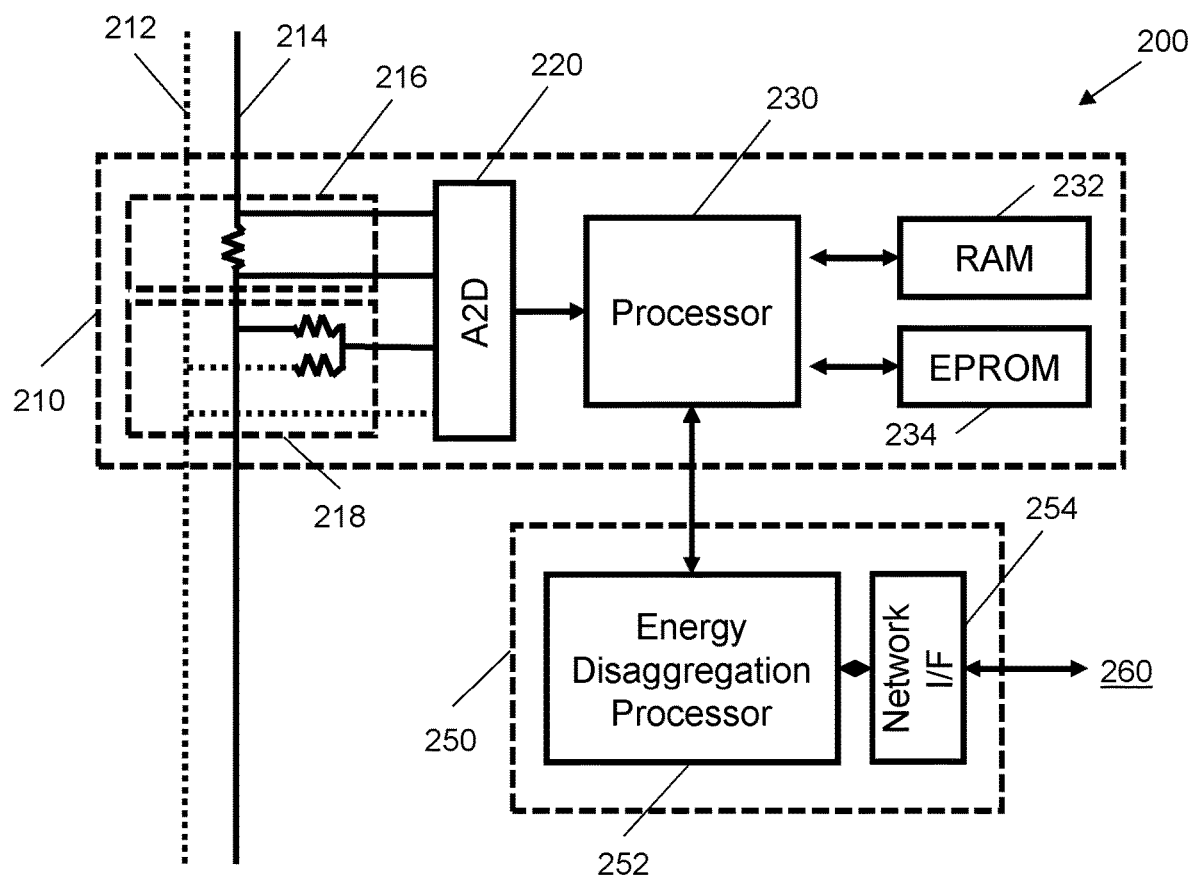
FIG. 2 is a schematic diagram showing an example smart meter and energy data processor.
Figure 3:
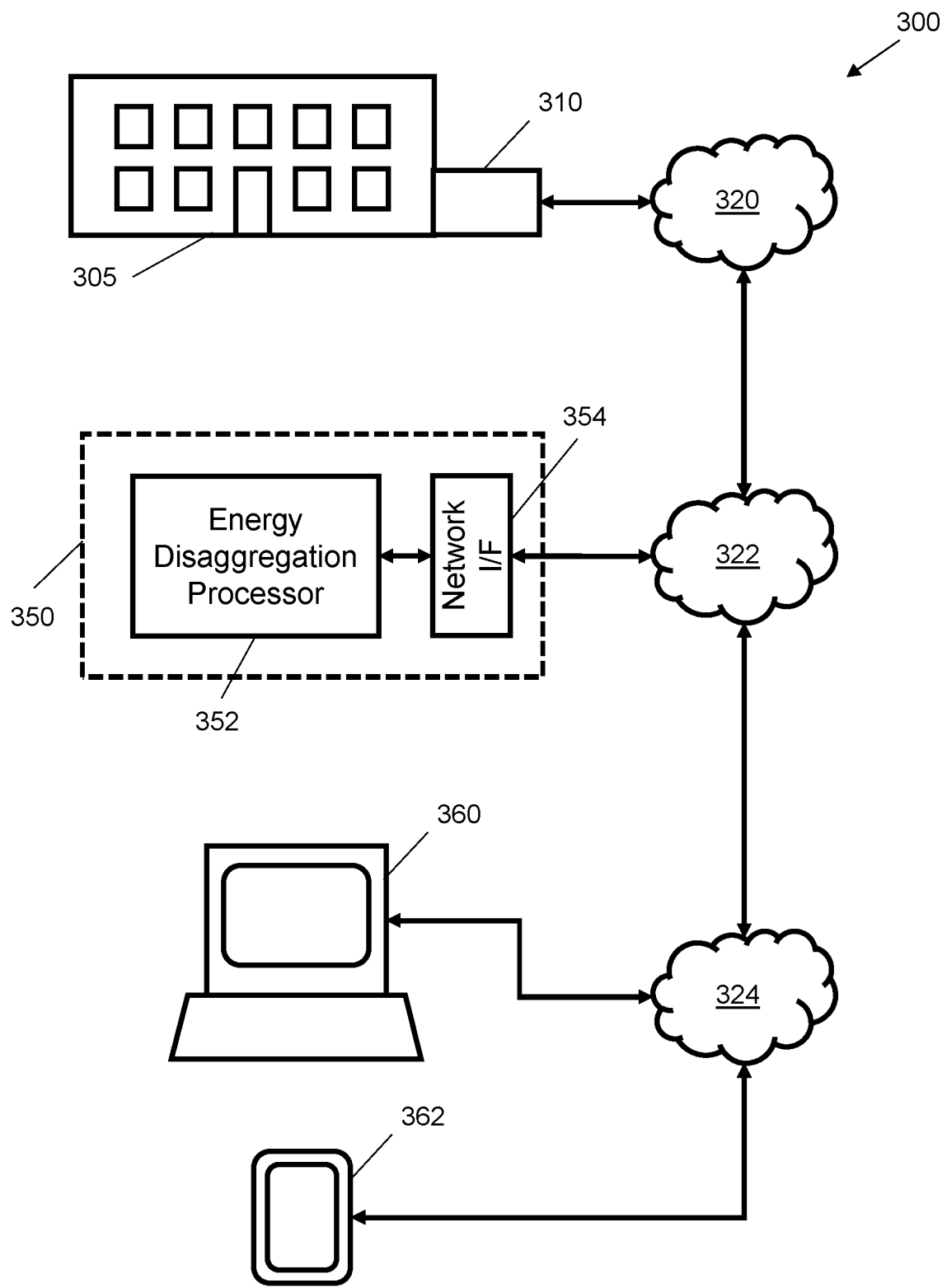
FIG. 3 is a schematic diagram showing networked components of an example energy disaggregation system for a building.

FIGS. 2 and 3 show two example contexts for an energy disaggregation system. FIG. 2 shows how an example energy disaggregation system may be incorporated into a smart meter that is locally installed within a building. FIG. 3 shows an example energy disaggregation system that is located remotely (e.g., in relation to the building). Both contexts may be seen as alternatives and/or complementarily, e.g. in the latter case, a distributed energy disaggregation system may have both local and remote processing components.

The example 200 of FIG. 2 shows an energy measurement device 210 and an energy disaggregation system 250. The energy measurement device 210 in this example is configured to measure electricity use, but other non-illustrated examples may measure liquid and/or gaseous fuel flow or other measures of energy consumption. The energy measurement device 210 in the present example is coupled to a neutral line 212 and a live line 214. Although this example shows an active coupling to these electricity lines (212 and 214), other measurement sensors may use a passive coupling, e.g. using electromagnetic approaches and passively induced fields and/or currents. The energy measurement device 210 comprises a current sensor 216 and a voltage sensor 218 that provide analogue measurement readings to an analogue-to-digital (A2D) converter 220. The A2D convertor 220 then digitalises the sensor readings (e.g., outputs an 8 or 16-bit reading) and provides this to a measurement processor 230. The measurement processor 230 is electronically coupled to a volatile random-access memory (RAM) 232 and a non-volatile erasable programmable read-only memory (EPROM) 234. Firmware stored in the EPROM 234 may be loaded into RAM 232 in operation and be executed by the measurement processor 230. Computer program instructions that are executed by the measurement processor 230 are configured to compute energy load data for output, e.g. in the form shown in FIG. 1. The energy measurement device 210 may thus be seen as a form of embedded computer. It should be noted that many different configurations are possible, and FIG. 2 is provided as an example to illustrate one approach to obtain energy load data.

In the example 200 of FIG. 2, the measurement processor 230 is communicatively coupled to an energy disaggregation processor 252 that forms part of the energy disaggregation system 250. The energy disaggregation system 250 also comprises a network interface 254 that is communicatively coupled to the energy disaggregation processor 252 (e.g., may be coupled via a systems bus). The network interface may comprise a known wired and/or wireless interface (such as a wired Ethernet interface or a wireless ZigBee®, Bluetooth® or Wi-Fi® interface). The network interface 254 may be used to communicate over a network 260. In FIG. 2, the energy disaggregation system 250 is shown as a separate sub-system and may be implemented as a configurable "upgrade" to a pre-existing smart meter that comprises the energy measurement device 210. In certain cases, e.g. for newer devices, the energy disaggregation system 250 may be included as part of the energy measurement device 210, e.g. the measurement processor 230 may be adapted to perform the functions of the energy disaggregation processor 252.

In use, the measurement processor 230 is configured (e.g., via processing of firmware loaded into the RAM 232) to compute an energy use metric based on the digitalised measurements from the current sensor 216 and the voltage sensor 218. The measurement processor 230 may be configured to poll the A2D converter 220 at regular, or otherwise determined, time intervals and obtain digital data values for measured current and voltage that may then be multiplied to obtain a power measurement. The power measurement may then be integrated or otherwise summed over the period of measurement to determine an energy use value in Watt-hours or kilo Watt-hours. The energy use value is then provided to the energy disaggregation processor 252 as energy load data, such as that shown in FIG. 1. In examples, different pre- and post-processing functions may be applied as necessary to generate energy load data in a desired format. The precise computations for the raw energy load data obtained by the energy disaggregation processor 252 do not form the focus of the present examples.

FIG. 3 shows an arrangement 300 that may be used for remote monitoring of energy consumption for a building 305. In the example of FIG. 3, the building 305 comprises a building services unit 310 that is communicatively coupled to a series of computer networks 320, 322 and 324. The building services unit 310 may comprise an energy measurement device such as device 210 in FIG. 2, wherein the energy measurement device comprises a network interface to couple it to the network 320 (e.g., similar to the network interface 254). In the example of FIG. 3, an energy disaggregation system 350 similar to the energy disaggregation system 250 of FIG. 2 is provided, but in this example the energy disaggregation system 350 is remote from the building 305 and the building services unit 310. The energy disaggregation system 350 comprises an energy disaggregation processor 352 and a network interface 354 as per the example of FIG. 2; however, in this case, the network interface 354 is communicatively coupled to network 322. The network interface 354 thus receives energy load data from the building services unit 310 via networks 320 and 322. Depending on the configuration the energy disaggregation system 350 may receive data continuously (e.g., every minute, 15-minutes or hour) or in batches (e.g., every day or every week). Either approach, or a combination of approaches, may be used.

In FIG. 3, the energy disaggregation system 350 is further communicatively coupled to a third computer network 324 that allows communication with one or more computing devices. In FIG. 3, a desktop computing device 360 and a mobile computing device 362 (such as a tablet or smartphone) are shown. The desktop computing device 360 and the mobile computing device 362 communicate with the energy disaggregation system 350 to obtain processed energy load data, e.g. for visualisation using a display of either device. In one case, a similar approach may also be used to communicate with the energy disaggregation system 250 of FIG. 2. In yet another case, the energy disaggregation system 250 of FIG. 2 may be coupled to a local display device for visualisation of the output of the energy disaggregation system 250. Those skilled in the art will appreciate that many different configurations of local, remote and distributed devices are possible, with many variations to those described in FIGS. 2 and 3, and the examples described below may be applied in multiple different circumstances.

Figure 4:
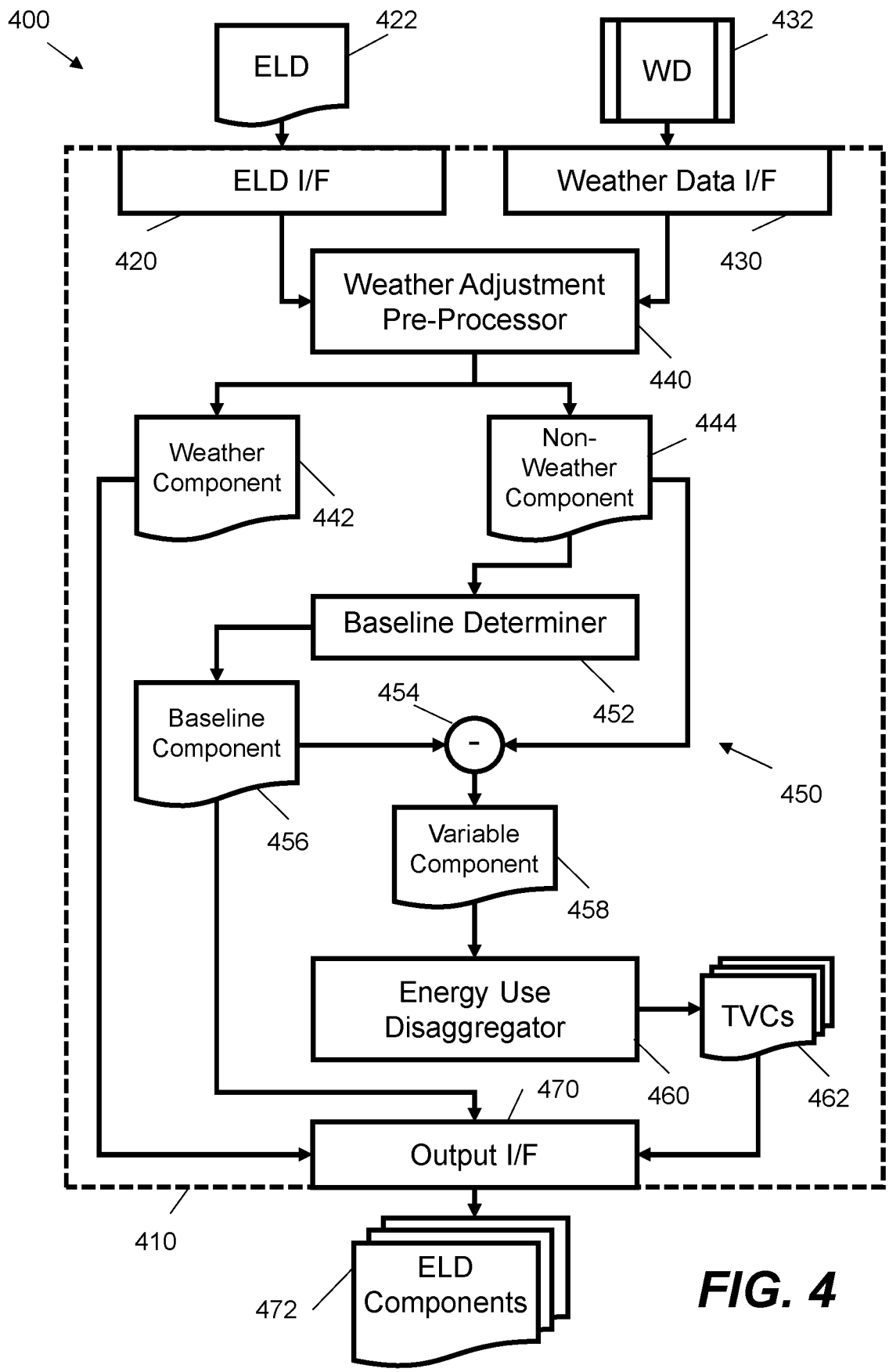
FIG. 4 is schematic diagram showing example components of an energy disaggregation system for a building.

FIG. 4 shows an example functional configuration 400 for an energy disaggregation system 410, such as the energy disaggregation system 250 of FIG. 2 and/or the energy disaggregation system 350 of FIG. 3. For example, the energy disaggregation system 410 may be implemented using the energy disaggregation processors 252 or 352 of FIGS. 2 and 3, e.g. by executing instructions loaded from firmware. Components shown in FIG. 4 may be implemented in hardware, or via a combination of hardware and program code. In certain cases, the energy disaggregation system 410 may be implemented using one or more application specific integrated circuits (ASICs) or field-programmable gate arrays (FPGAs). In other cases, the energy disaggregation system 410 may be implemented by a server computing device that comprises a processor, memory and one or more input/output interfaces. The energy disaggregation system 410 is configured to disaggregate energy load data for a building. The building may comprise a non-residential building, e.g. a commercial or public building. In certain cases, such as those similar to the example of FIG. 3, the energy disaggregation system 410 may be configured to disaggregate energy load data for a plurality of buildings.

The energy disaggregation system 410 comprises an energy load data interface 420, a weather data interface 430, a weather adjustment pre-processor 440, a baseline adjustment pre-processor 450, and an energy use disaggregator 460. In the present example, an output interface 470 is also provided to provide an output of the energy disaggregation system 410. In certain cases, this may be omitted, e.g. where the components determined by the energy disaggregation system 410 are used internally for further energy load processing.

The energy disaggregation system 410 is configured to operate on energy load data 422. This may comprise energy load data as described above and as shown in FIG. 1. The energy load data originates from energy use sensors for the building. For example, the energy load data 412 may be received from a locally coupled energy measurement device, such as device 210 in FIG. 2, or a remote energy measurement device that is communicatively coupled over a network, e.g. from a device installed in building services unit 310. The energy load data 412 may comprise time-series energy consumption measurements for the building. In certain examples, energy consumption may be measured for different fuel types, including, amongst others, electricity, natural gas, diesel, and propane. The example of FIG. 4 may be applied independently of the fuel type that is used within a building and may also be applied with a combination of multiple fuel types within a single building.

The energy disaggregation system 410 of FIG. 4 receives the energy load data 422 at the energy load data interface 420. In certain cases, this may comprise a local systems interface, e.g. a systems bus that communicatively couples the measurement processor 230 and the energy disaggregation system 250 of FIG. 2. In other cases, the energy load data interface 420 may comprise a memory or storage interface to receive the energy load data 422 from a communicatively coupled memory or storage device (e.g., as historical data). This may be the case where energy load data 422 is received in batches from remote energy use sensors. In yet another case, the energy load data interface 420 may comprise a network interface such as network interface 354 in FIG. 3, whereby the energy disaggregation system 410 receives the energy load data 422 over a network. Different configurations and combinations of configurations are possible, depending on the precise implementation. Energy consumption data may be measured and/or provided in various units. The units of measurement may depend on a fuel type being used. In certain examples, the energy load data interface 414 may include pre-processing functions that convert from a set of provided units into energy consumption values in kilo Watt-hours.

In one case, the energy load data interface 420 may comprise an application programming interface (API) for retrieval of energy load data 422. For example, utility companies may collect energy consumption data using one or more of the systems shown in FIGS. 2 and 3. The utility company may then allow for client-side requests to the API to retrieve the energy load data 422. In certain cases, these requests may be authorised by an owner or controller of the building. The utility company may provide a server-side API for access to their databases of energy load data and/or may provide the energy load data to one or more third parties. These third parties may then provide a server-side API and may be responsible for requesting energy load data from the utility company, cleaning and/or pre-processing this data and then making the data available to requests from the client-side energy load data interface 420. Different configurations for data access are possible depending on multiple factors including building, utility company, fuel type etc.

As well as the energy load data 422, the energy disaggregation system 410 also receives weather data 432 at the weather data interface 430. The weather data 432 may comprise at least an outdoor temperature for a location that includes the building. For example, the weather data 432 may be provided by a national body for a country where the building is located. Examples of national bodies that provide weather data 432 data sources include the Meteorological Office in the United Kingdom and the National Weather Service in the United States of America. The weather data 432 may be provided by making requests to a network-coupled application programming interface (API), such as a RESTful data source hosted by a webserver. In this case, the weather data interface 430 may comprise a combination of one or more of a network interface and the API. In this case, the weather data 432 for a particular location may be retrieved based on geo-location data, such as a latitude and longitude for the building and/or a post or zip code. In another, or complementary, example, the weather data interface 430 may comprise a memory or storage interface to receive the weather data 432 from a communicatively coupled memory or storage device. In this or another case, the weather data 432 may also be provided by weather sensors mounted to the building under analysis, e.g. from one or more external thermometers and/or wind monitoring devices. Different configurations and combinations of configurations are possible, depending on the precise implementation.

The weather adjustment pre-processor 440 receives the energy load data 422 from the energy load data interface 422 and the weather data 432 from the weather data interface 430. The weather adjustment pre-processor 440 is configured to process the energy load data 422 and the weather data 432 and to determine a weather-dependent energy use component 442 of the energy load data and a weather-independent energy use component 444 of the energy load data.

In certain examples, the weather adjustment pre-processor 440 fits a model to the energy load data 422 and the weather data 432. For example, this may comprise modelling the energy load data 422 as a function of the weather data 432 (e.g., which may be represented as fitting a line or curve to a plot of the energy load data against the weather data). This function may represent the response of the present building to weather (such as a response to outside temperature). The modelling may be performed for a series of times over a sampling period, which may be represented by a time-step index i.

In one case, the weather adjustment pre-processor 440 may fit a linear (including multi-linear) model (e.g., a linear or multi-linear regression model) to the weather data 432. For example, one suitable model is described by Mathieu, J. L. et al. (2011) in "Quantifying changes in building electricity use, with application to demand response", IEEE Transactions on Smart Grid, 2 (3), pp. 507-518 (doi: 10.1109/TSG.2011.2145010), which is incorporated herein by reference. Present approaches adapt this model to separate weather dependent from weather independent elements.

In the case above, a plot of energy load against temperature commonly results in a "U" shaped curve for a building—the temperature response of the building. The energy load data 422 and the weather data 432 may be received with, or pre-processed to have, a shared time base (e.g., each set of data may be indexed by a time-step index i—ELD (i) and T(i) where ELD is a real value for the energy load at time i and T is the outdoor temperature at time i in degrees Celsius or degrees Fahrenheit—i may indicate an index of a particular 15-minute period or hourly period depending on the energy load data sampling frequency). In a simple case, the weather-dependent energy use component $ELD_{WD}$ may be computed as $ELD_{WD}(i)=B*T(i)$ and the weather-independent energy use component $ELD_{WI}$ may be computed as $ELD_{WI}(i)=ELD(i)-ELD_{WD}(i)$, where ELD (i) is the original energy load data 422. More complex models may also be used as desired—the energy disaggregation system 410 has a modular configuration that allows for different models to be used.

For example, in one case, a piecewise continuous temperature response model may be used. In this case, weather data 432 may be split into different groups or ranges and different linear weights applied to each group or range. In one case, a first threshold may set a base temperature group, where a first temperature factor is set as the threshold if the input temperature value is greater than the threshold (and set to the input temperature value if below the threshold). Following this, a plurality of thresholds may be defined to create different temperature bands, wherein, if the input temperature value falls within a band (i.e. is above threshold A but below threshold B), then the band temperature factor is set as the input temperature value minus the lower threshold (A), and wherein, if the input temperature value is above the band, a value for the band is set as the band width (e.g. B−A). For example, a temperature of 28 degrees Celsius may be broken down as follows:

| Band or Range | Threshold | Value for Regression | Condition Used |
| --- | --- | --- | --- |
| $T_0$ | 15 | 15 | $T_i > 15: T_0 = 15$ |
| $T_1$ | 20 | 5 | $T_i > 20: T_1 = 20-15$ |
| $T_2$ | 25 | 5 | $T_i > 25: T_2 = 25-20$ |
| $T_3$ | 30 | 3 | $T_i < 30: T_3 = 30-28$ |
| $T_4$ | 35 | 0 | $T_i < 30: T_4 = 0$ |
| $T_5$ | 40 | 0 | $T_i < 30: T_5 = 0$ |

In this case, for an input temperature value, there may be six values for linear regression of every time point, e.g $$ELD_{WD}(i) = \sum_{k=0}^{5} \beta_k * T_k(i)$$

where $\beta_0$ to $\beta_5$ are regression weights for the band temperature values $T_0$ to $T_5$ (e.g. 15, 5, 5, 3, 0, 0 in the table above). Different temperature bands and different numbers of factors (i.e. different values of k) may be configured based on implementations. In one case, a predefined number (k) of bands may be set, and the threshold points may be dynamically assigned such that they are equidistant from a minimum and maximum value within the time-series (i.e. weather data 432); for example, if a temperature range is 0 to 50, threshold points may be 0, 10, 20, 30, 40 and 50 and if a temperature range is 15 to 40, threshold points may be 15, 20, 25, 30, 35 and 40. The number of bands (k) may be expanded depending on implementations and/or may be set dynamically based on the input data.

In one model, a constant a may also be added to the model. The constant may be dependent on a time-step index j—e.g., $\alpha_j$. The time-step index j may be equal to i or may be a function of i—e.g., $\alpha_j=\alpha(i)$. For example, the time-step index j may be dependent on one or more of a time of the week or a day of the week. If the energy load data 422 and the weather data 432 have an hourly time-step index i, then data for a year may have 8760 data values, $0 \leq i < 8760$, and if the constant alpha is based on an hour in the week, then there may be 168 values for alpha, i.e. $0 \leq j < 168$. In this case, $$ELD_{WD} = \alpha(i) + \sum_{k=0}^{K} \beta_k * T_k(i)$$

or $ELD_{WD}(i)=a(i)+\beta*T(i)$ where $\alpha_j=\alpha(i)$. The constant may be a function of a datetime stamp, e.g. $\alpha(j)$ may retrieve a value from a look-up table based on a datetime stamp. In yet another case, which is described later with respect to FIG. 6, weather models may include a factor based on a determined occupancy of the building. For example, when the building is determined to be unoccupied the model $ELD_{WD}(i)=\alpha(i)+\beta*T(i)$ may be applied, with the model $$ELD_{WD} = \alpha(i) + \sum_{k=0}^{K} \beta_k * T_k(i)$$

being applied for occupied periods. Values for α and β (e.g., in both scalar and vector implementations) may be determined by fitting the models to historical data sets of the energy load data and the weather data. In certain cases, values for α and β may be determined by the weather adjustment pre-processor 440 for a particular building being analysed.

Returning to FIG. 4, the weather-dependent component 442 is passed to the output interface 470 where it may be supplied as one of the output components 472. The weather-independent component 444 is passed to the baseline adjustment pre-processor 450 for further pre-processing. The baseline adjustment pre-processor 450 is configured to process the weather-independent component 444 and determine a baseline energy use component 456 of the energy load data In the example of FIG. 4, the baseline adjustment pre-processor 450 comprises a baseline determiner 452 and a comparator 454. The baseline determiner 452 receives the weather-independent component 444 of the energy load data and determines a baseline within the weather-independent component 444 to extract the baseline component 456. In one case, the baseline component 456 is determined as a predefined portion of the weather-independent component 444. For example, the baseline component 456 may be a predefined percentile of the weather-independent component 444. In implementations, the $15^{th}$ percentile of the weather-independent component 444 (i.e. $E_{Total}-E_{weather}$) resulted in a useful baseline component 456; the percentile may be set as a predefined parameter. Using the comparator 454, the baseline adjustment pre-processor is configured to remove the baseline component 456 from the weather-independent component 444 to determine a variable energy use component 458 of the energy load data; for example, $ELD_V=ELD_{WI}-ELD_B$, where $ELD_V$ is the variable component, $ELD_{WI}$ is the weather-independent component 444 and $ELD_B$ is the baseline component 456.

Within the energy disaggregation system 410, the variable energy use component 458 of the energy load data is then passed to the energy use disaggregator 460 for processing. The energy use disaggregator 460 is configured to determine a plurality of time-varying load components 462 of the energy load data. Depending on the implementation these may comprise: a lighting load component; a small power load component; and a miscellaneous load component. In certain examples, these may additionally comprise a heating, ventilation and air conditioning (HVAC) load component (e.g., depending on the climate and systems of the building). The plurality of time-varying load components 462 of the energy load data may be considered to be scheduled loads within the energy load data 422. The term "time-varying" is used as the extend of each load component 462 may vary with time, i.e. change between time samples. However, it should be noted that these load components 462 may include load components with substantially constant proportions over time, e.g. that change based on the received gross energy load value-such that if this gross energy load value is constant then the load components 462 may also be constant. They may alternatively be referred to as auxiliary or additional load components.

In the example of FIG. 4, at least the weather-dependent energy use component 442, the baseline energy use component 456 and the time-varying load components 462 of the energy load data are provided to the output interface 470 for output as a set of energy load data components 472. For a given data sample, the set of energy load data components 472 may be computed as described to sum to the raw energy load data value. If the energy load data 422 is provided as a one-dimensional array of time-series data, with a windowed length (in time) of P, the set of energy load data components 472 may be provided as a C by P matrix or array where C is equal to the number of extracted components. Alternatively, the energy disaggregation system 410 may provide a stream of data (e.g. of samples of length C) that is synchronised to a stream of input energy load data 422. Multiple output formats are possible depending on the implementation.

Figure 5:
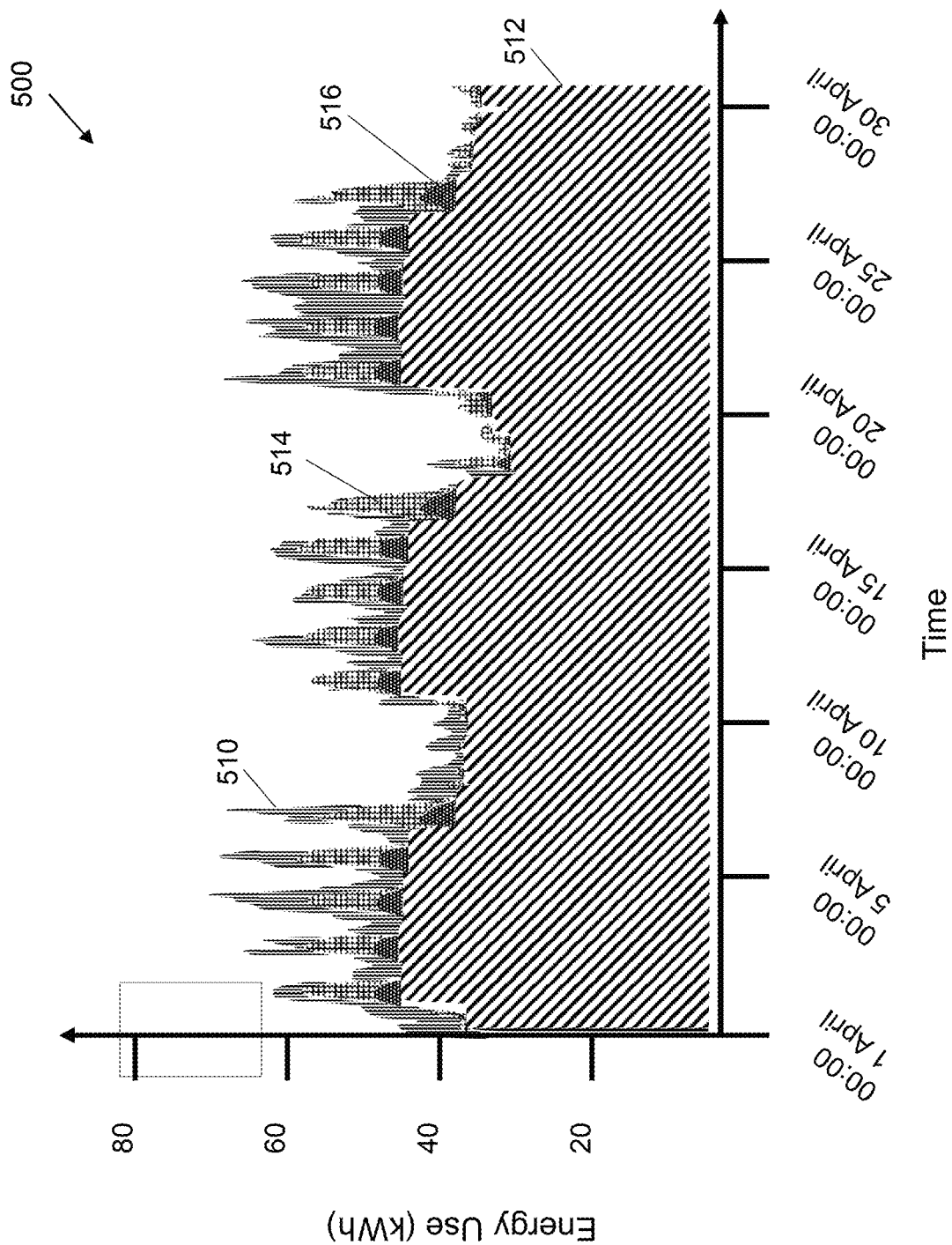
FIG. 5 is a visualisation of determined components in a set of energy load data.

FIG. 5 shows an example visualisation 500 of a set of energy load data components 472. In visualisations each energy load component may be displayed as a different colour. In FIG. 5, each energy load component is displayed with a different form of pattern hatching. Four energy load components are shown for simplicity: a weather-dependent component 510 (that may represent weather dependent component 442; a baseline component 512 (that may represent baseline component 456); and two time-varying load components shown as 514 and 516 (that may represent time-varying load components 462). Time-varying load component 514 may represent a miscellaneous load component and time-varying load component 516 may represent a lighting load component. The extent of the set of energy load data components in the y-direction equals the originally received energy load data.

In one example, the energy use disaggregator 460 may determine one or more of the energy load data components 472 based on properties of the building. For example, building properties, such as one or more of building type (including building use type), building location and building age, may be used to determine a proportion of the variable energy use component 458 of the energy load data at a given time sample that is associated with each of one or more time-varying loads. This approach may be used for one or more of lighting and small power loads, with a miscellaneous load being the remainder after lighting and small power loads have been deducted from the variable energy use component 458. In one case, the proportion for a given load type may be determined using a model based on historical and/or comparative data. In one case, the proportion may be determined based on a benchmark, e.g. based on data for other buildings and/or past analysis. In one case, the proportion may be output from a machine learning model, given a set of numerical building properties as an input, where the machine learning model may be trained given a dataset of known building properties and load proportions. In one case, a machine learning model such as an artificial neural network may be trained to output a probability vector representing different proportions for a set of time-varying loads. Again, such a machine learning model may be trained based on a dataset of known building properties and load proportions, where the load proportions for the set of time-varying loads form the Y or output ground truth for training. In other cases, a look-up table may be used that is indexed by the building properties.

The energy use disaggregator 460 described in the paragraph above may be advantageous when only limited high-level building information is available. For example, it may only be possible to obtain high-level building information such as building type, location, area and energy measurement readings. In this case, proportions for a lighting load and a small power load may be determined based on the building information.

In one variation, the energy use disaggregator 460 determines a lighting load component from the variable energy use component 458 of the energy load data. The lighting load component may be determined based on one or more of the lighting operating data and a lighting power density. In one case, the lighting operating data and/or lighting power density may be determined from building information, such as a number of lights per unit area and/or a lighting type (e.g. fluorescent, incandescent or halogen). In another case, as described above, a proportion may be determined based on building information, which may in some cases not use any specific lighting data. In one case, the energy disaggregation system 410 may comprise a lighting data interface to receive lighting operating data for the building. This may be configured similarly to the input interfaces 420 and 430. Lighting operating data may comprise a lighting operating schedule, e.g. a set of times when lighting is switched on and off within the building.

In certain examples, the energy disaggregation system 410 of FIG. 4 may be adapted to use occupancy data to determine the set of energy load data components 472. For example, one or more of the weather adjustment pre-processor 440 and the energy use disaggregator 460 may be configured to receive and process occupancy data. The weather adjustment pre-processor 440 may use occupancy data to determine weather-based energy load models for periods when the building is occupied and for periods when the building is unoccupied. Different linear regression parameters may be determined for these different periods, which may allow for a more accurate modelling of weather-dependent factors. The energy use disaggregator 460 may also be configured to use occupancy data to determine one or more of the time-varying load components 462. For example, the time-varying load components 462 may comprise a small power load component and the energy use disaggregator 460 may be configured to determine the small power load component based on one or more of the estimated periods of occupancy and a small power density. This may be determined using benchmarking and/or machine learning models. The energy use disaggregator 460 may also use occupancy data to determine a lighting load component. In the examples described herein, a miscellaneous load component may be determined as the remaining energy load level once a lighting load component and a small power load component have been removed from the variable component 458.

Figure 6:
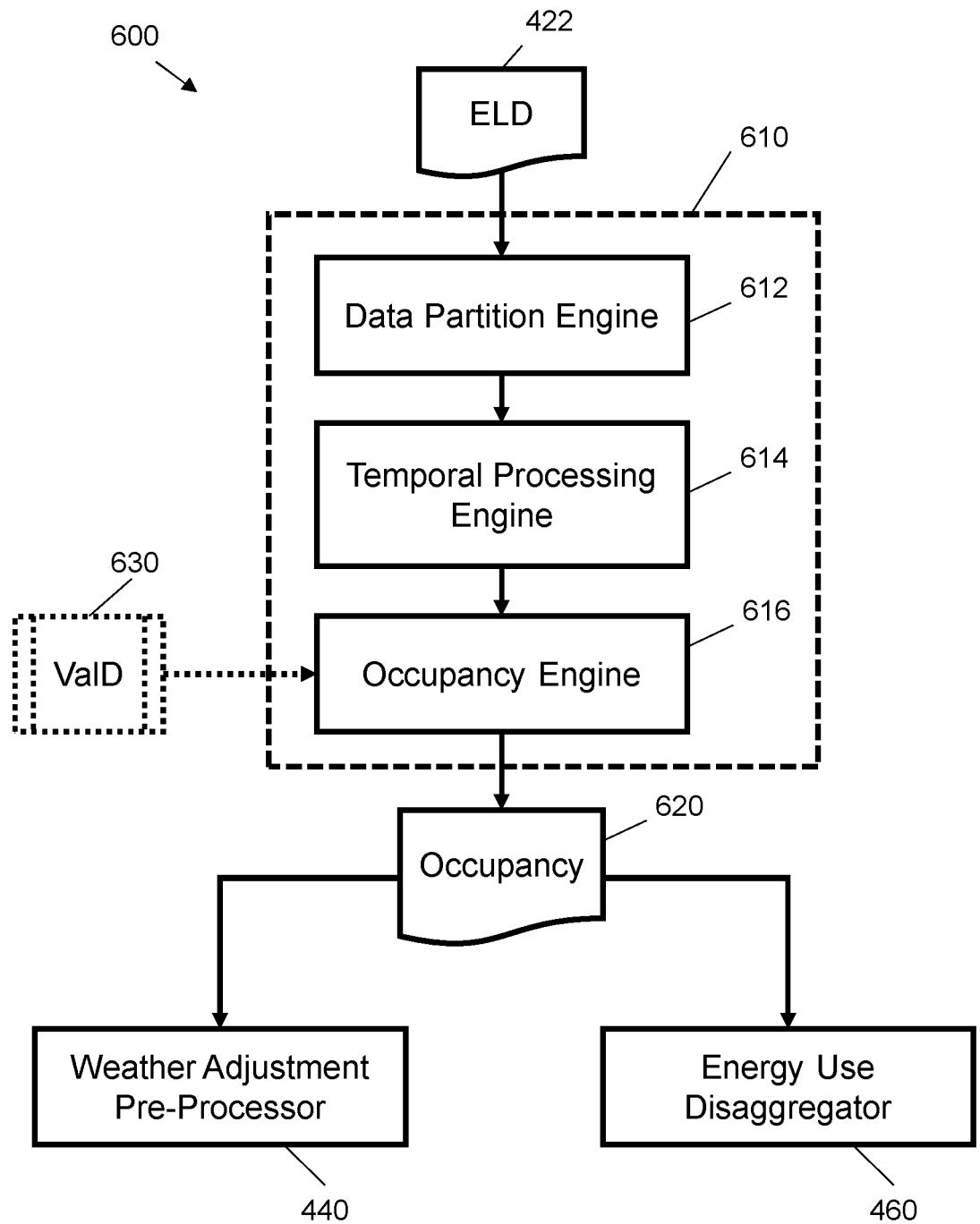
FIG. 6 is schematic diagram showing additional example components for a variation of the energy disaggregation system of FIG. 4.

In the example 600 of FIG. 6, an additional energy load processor 610 is shown. This additional energy load processor 610 may be included as an additional modular component within the energy disaggregation system 410 of FIG. 4. The additional energy load processor 610 receives the energy load data 422 (e.g., via the energy load interface 420 or otherwise) and determines occupancy data 620 from this data. The occupancy data 620 is then made available to one or more of the weather adjustment pre-processor 440 and the energy use disaggregator 460.

In particular, the additional energy load processor 610 of FIG. 6 comprises a data partition engine 612, a temporal processing engine 614 and an occupancy engine 616. In this example, the data partition engine 612 is provided to improve accuracy when the energy load data has unpredictable shifts or changes in the data (e.g., as shown in the data in FIG. 1). In cases where the energy load data does not display these shifts or changes, one or more of the temporal processing engine 614 and the occupancy engine 616 may be applied directly to the energy load data 422 to determine occupancy data 620.

In certain examples, the data partition engine 612 is configured to apply a clustering model to the energy load data 422 to determine one or more partitions within the data. This may then be used to differentially process the energy load data 422 for different partitions or period within the data. The temporal processing engine 614 is configured to segment and aggregate the energy load data over a set of predefined time periods. When no partitioning is to be performed, this may be applied directly to the energy load data 422. When partitioning is to be performed, the temporal processing engine 614 may be independently applied to each partitions determined by the data partition engine 612. In these examples, the occupancy engine 616 is configured to estimate periods of occupancy for the building using the output of the temporal processing engine 614. The occupancy engine 616 is thus configured to determine estimated periods of occupancy from the energy load data 422 and output these as occupancy data 620.

The clustering model applied by the data partition engine 612 may comprise a supervised or unsupervised machine learning model. In certain implementations, an unsupervised machine learning model may be preferred, as this may be applied without requiring a training set of labelled samples. The partitions may comprise assigned groups or clusters of data samples. Constraints may be applied to the clustering model, such as partitions are to be continuous over time within the energy load data and/or prior probability distributions for the number of partitions. Partitions may be labelled by assigning a partition identifier to data samples within the energy load data 422, e.g. a first set of data samples may be assigned to a first partition with a partition identifier of "01" and a second set of data samples may be assigned to a second partition with a partition identifier of "02". In one case, a new data structure may be created, e.g. the same length as a one-dimensional array comprising a time-series of energy use values, to store a partition identifier for corresponding elements in the energy load data 422. In other cases, different data structures (e.g., different arrays) may be created to store the energy load data corresponding to each partition.

In certain examples, the clustering model applied by the data partition engine 612 comprises a probabilistic mixture model. In this case, each partition may be associated with a particular mixture in the probabilistic mixture model. Each mixture may have a set of parameters that define the mixture (e.g., that define a probability distribution for the mixture). In a preferred case, the probabilistic mixture model comprises a Gaussian mixture model. In a Gaussian mixture model, different partitions may be defined as different Gaussian probability distributions (e.g., with different mean and covariance parameters), where each Gaussian probability distribution may also have a probability for any given data sample. In this case, the data partition engine 612 may apply an expectation maximisation function to determine parameters for the Gaussian mixture model. These parameters may then be used to apply a partition identifier to each data sample (e.g., based on a probability of each data sample belonging to each Gaussian probability distribution).

In the case that a Gaussian mixture model is applied, the data partition engine 612 may be configured to apply Bayesian inference to infer probabilistic distributions for the parameters of the Gaussian mixture model. For example, Bayesian methods of variational inference may be used that optimises a lower bound on model evidence including Gaussian mixture priors (i.e. the probabilities of each Gaussian probability distribution). Bayesian inference may use a Dirichlet distribution to model the mixture priors. Bayesian methods of variational inference may provide for improved modelling of the number of partitions, by down-weighting certain mixtures more effectively and so reducing the number of partitions that are deemed to be present; from testing, this approach appears to better match human intuition for the number of partitions that are present. Bayesian methods may be more resource intensive, and so may be preferred if suitable computing resources are available, e.g. may be better suited to remote server implementations that are shown in FIG. 3. Gaussian mixture model fitting methods, including Bayesian methods, may be implemented using machine learning libraries, such as scikit-learn or Matlab® and/or via custom programmed implementations. Default parameters for these methods may be used with appropriate variations depending on the implementation. The results shown in FIG. 7 that are explained in more detail below were generated by applying a Bayesian Gaussian mixture model. In a test case, the BayesianGaussianMixture method of the scikit-learn package was used with a number of initializations (n_init) equal to 20, a convergence threshold/tolerance of 1e-3, a "full" convergence type (each partition/component has its own general covariance matrix), a maximum number of expectation maximisation iterations (max_iter) of 500, the use of k means to initialise the weights (init_params="kmeans"), and a Dirichlet process (or so-called "stick-breaking process") for the weight concentration prior (weight_concentration_prior_type="dirichlet_process").

When applying a Bayesian Gaussian mixture model, a number of mixture components (i.e. partitions) may be set based on knowledge of the energy load data. This may represent a maximum number of components whereby the Bayesian estimation may determine that an actual number of components is less that the maximum number of components. In the BayesianGaussianMixture method of the scikit-learn package this may be set using the n components parameter. The number of components may thus represent an upper bound on the number of components to aid computational efficiency. In one case, a number of mixture components may be based a minimum time span for a partition within time-series energy consumption data. For example, a minimum time span may be set as a particular number of days within the time-series energy consumption data. In test cases, it a minimum number of days was set at 90 days (approximately 3 months) such that longer term changes across a year are identified. In this case, for a years' worth of data, the (maximum) number of mixture components may be set as 4 (i.e. 365/90). In certain cases, post-processing of the partitions may tend to reduce a number of final partitions that are output-hence, often the number of output partitions is less than the (maximum) number of mixture components. It should also be noted that although a number of components may be predefined, weights for some of these components may be set to 0, such that even if the number of components is set to 4, 5 or 10 over a given time period, only one partition may be determined to be present (e.g., only one partition may have non-zero weights and/or a suitably high probability value). The details here are intended for example only based on a test case, different hyper-parameter configurations from those described may be used for different implementations, for different buildings and for different sets of energy load data, amongst others.

In certain examples, the data partition engine 612 outputs a set of labelled partitions of the energy load data, e.g. there may be n partitions where n is greater or equal to 1. The value n may be set by a user as part of the clustering model, or, preferably, may be determined from the energy load data 422 by the clustering model (e.g., as may be the case with Bayesian Gaussian mixture models). In this case, the labelled partitions are received by a temporal processing engine 614. In certain examples, the temporal processing engine 614 is applied in parallel and/or series to each of the labelled partitions of the energy load data. The temporal processing engine 614 may output a series of aggregated data sets (e.g. m data sets). Each of these data sets may relate to a different time period, e.g. different days of the week or different times of day (if a daily aggregate or average for named days of the week is generated then m=7). Aggregated data sets may be output for each of the plurality of partitions (e.g., for n partitions, n*m aggregated data sets may be output).

Figure 7:
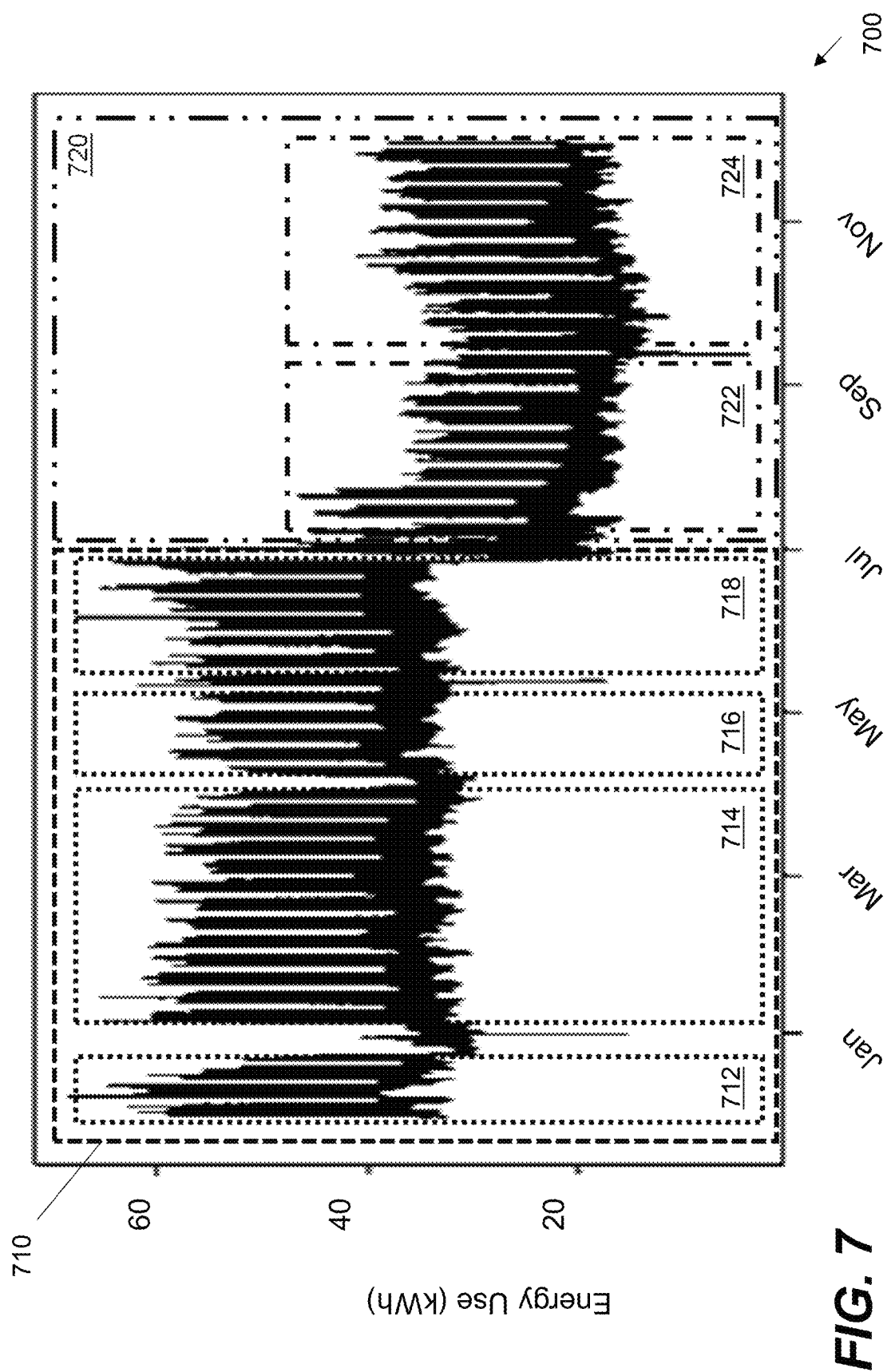
FIG. 7 is a visualisation of a set of energy load data that is partitioned using the additional example components of FIG. 6.

FIG. 7 shows a visualisation 700 of data output by the data partition engine 612 of FIG. 6. The underlying energy load data is that shown in FIG. 1. FIG. 7 thus shows an application of the data partition engine 612 to the energy load data 110 of FIG. 1. FIG. 7 illustrates two partitions that are deemed to be present by the data partition engine 612: a first partition 710 shown within a dashed line running from the start of the chart to July and a second partition 720 shown within a dash-double-dot line running from July to the end of the chart. At a data level, the partitions may be assigned by assigning a partition identifier to individual data elements or samples within the energy load data—e.g. data samples from January to July may be assigned a partition identifier of "01" whereas data samples from July to December may be assigned a partition identifier of "02".

The example of FIG. 7 also shows how the data partition engine 612 may apply a clustering model that does not assign partition identifiers to all data samples and/or that applies a probabilistic classification for labelled data samples. In the latter cases, a number of partitions may be defined by the clustering model and, for at least a subset of data samples, each sample may be assigned a probability for each of the number of partitions (e.g., as a values in a probability vector or array). In this case, the data partition engine 612 may further apply a post-processing function to process assignments and/or probability values and output a final or one-hot assignment to a particular partition. For example, in FIG. 7, data samples in groups 712, 714, 716 and 718 are assigned (or have a high probability of assignment) to a first partition and data samples in groups 722 and 724 are assigned (or have a high probability of assignment) to a second partition. Data samples that fall outside of these groups may have no assignments and/or probability values below a predefined threshold. In this case, the post-processing function processes the assignments for the data samples to assign data samples to continuous groups representing the partition 710 and the partition 720. In one case, a particular partition for a given data sample may be selected based on a maximum likelihood, e.g. a largest probability value across multiple partitions.

Figure 8A:
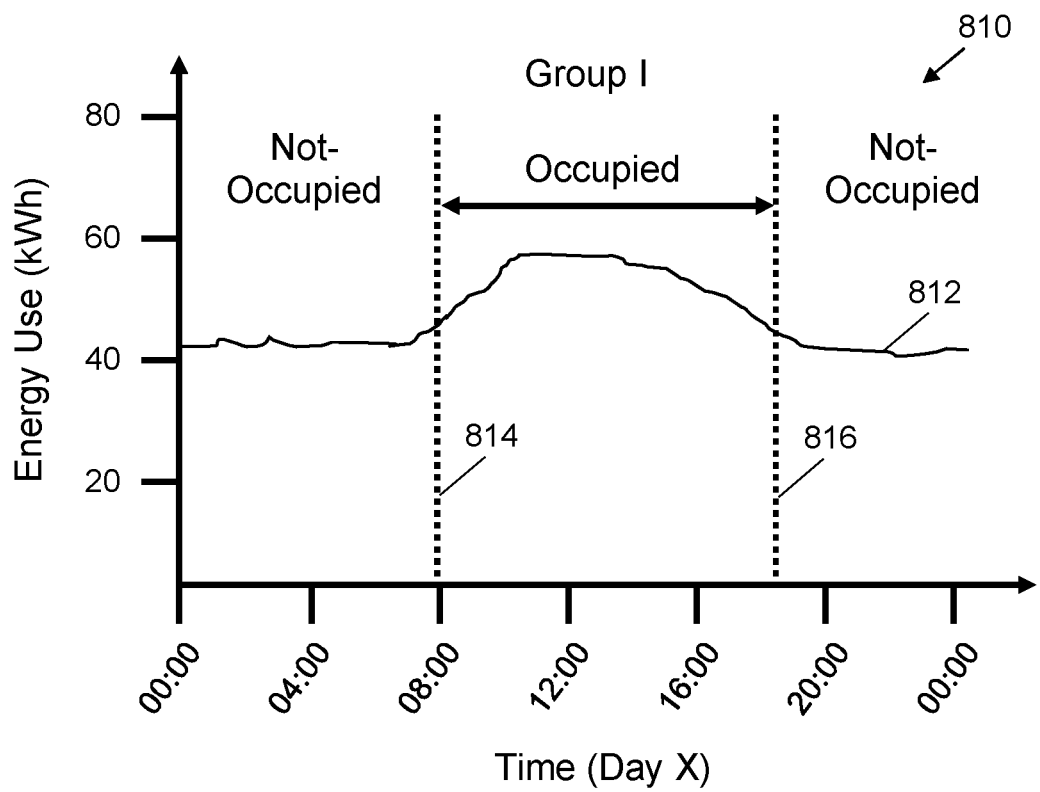
FIGS. 8A and 8B are visualisations showing how partitioned energy load data may be used to determine occupancy data for a building.
Figure 8B:
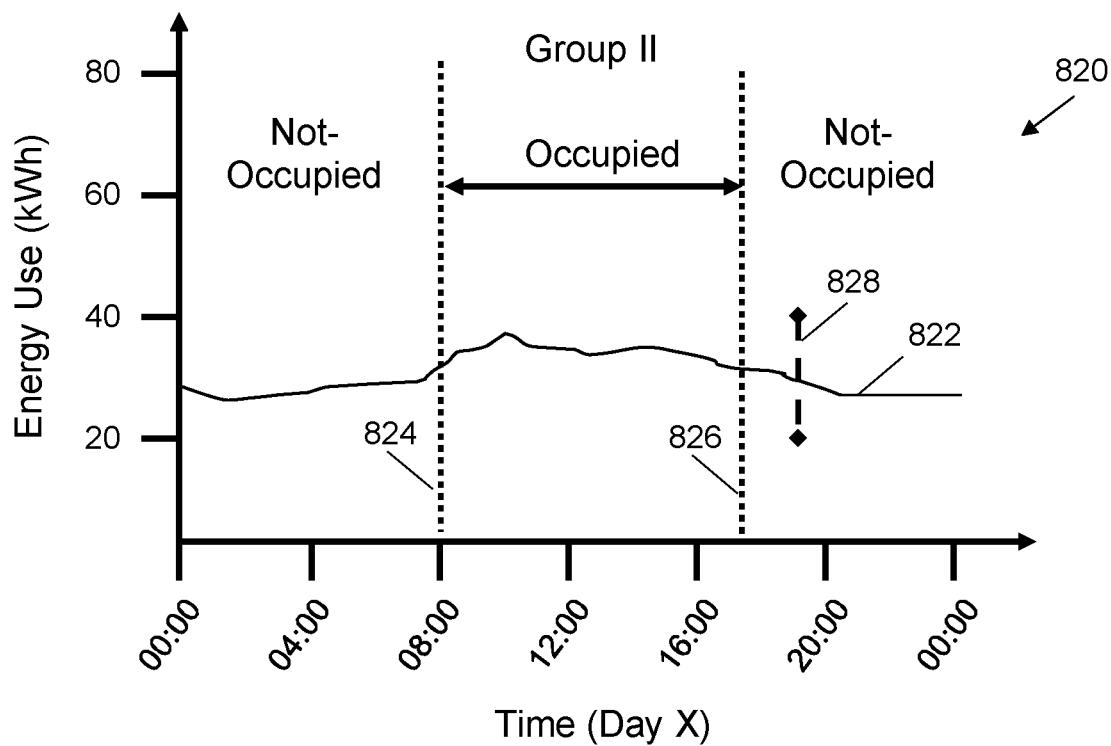

An example set of occupancy data is shown in FIGS. 8A and 8B. In these examples, energy use values derived from the energy load data 422 are assigned to a plurality of occupancy classes. Two classes are shown in FIGS. 8A and 8B: an "occupied" class and an "unoccupied" class. These classes are applied to data values representing energy use (in kWh) over a predefined time period. In FIGS. 8A and 8B, the predefined time period comprises a day and the x-axis of charts 810 and 820 comprises sample times within the day (e.g., minute, 15-minute or hourly sample points within a 24-hour cycle). The data samples of FIGS. 8A and 8B may thus be represented as a triple-(timestamp, energy use, occupancy class). The data for a particular day of the week (day "X", which may be a weekday) is shown. FIGS. 8A and 8B show examples of occupancy data for each of the two partitions 710 and 720 shown in FIG. 7. These are labelled as "Group I" (i.e. partition 710) and "Group II" (i.e. partition 720).

In one case, the temporal processing engine 614 may be configured to group received energy load data (e.g. by partition if that is applied) into data associated with each day of the week. For example, the received energy load data may be grouped into data associated with each of the named days of the week (i.e. Monday, Tuesday, Wednesday, Thursday, Friday, Saturday and Sunday). This may be performed by applying a day-of-the-week look-up operation to a time/date-stamp associated with each data sample.

If partitioning is applied by the data partitioning engine 612, the temporal processing engine 614 may collate data samples in each of the partitions. For example, it may first group the data samples by day-of-the-week and then by time of day. This results in a collection of data samples across each partition period for each day, where corresponding times in each named day are grouped (e.g., 08:00 on Tuesday for partition 1 will have a plurality of data samples where the energy use data 422 may be originally supplied in minute, 15-minute or hourly samples). An aggregated energy use metric may then be computed for each time-group, e.g. an average energy use for a plurality of times in a named day. Values of this aggregated energy use metric for day X are shown as line 812 for Group I and line 822 for Group II. In one case, the aggregated energy use metric as shown as lines 812 and 822 may be output for display in a similar manner to FIGS. 8A and 8B, e.g. on a smart meter or mobile computing device display. It should be noted that in certain data sets that show shifts and changes it may not be possible to provide the aggregated energy use metrics as shown without the partitioning of the energy load data. For example, line 812 has a different baseline level to line 822 (e.g. around 40 and 25 kWh respectively).

In FIG. 8A, the data for Group I is shown in chart 810 with the energy use metric shown as line 812. In this chart 810, data samples up to point 814 are assigned to a "not occupied" class, data samples between point 814 and 816 are assigned to an "occupied" class, and data samples beyond point 816 are assigned to the "not occupied" class again. Assignments of occupancy classes may be performed using the binary threshold approach described below or probabilistically (e.g. with class probability vectors), with one-hot vectors for each class and/or via a separate data structure with multi-class identifiers. If one or more separate data structures are used for the assignment of occupancy labels, these may be the same length as the original energy use metric 812 such that data elements correspond. FIG. 8B shows a corresponding assignment for chart 820 representing the Group II data, as shown via line 822. In this case, data samples up to point 824 are assigned to a "not occupied" class, data samples between point 824 and 826 are assigned to an "occupied" class, and data samples beyond point 826 are assigned to the "not occupied" class again.

In a preferred example, the occupancy engine 616 processes data to determine an "operational pattern". This processing may be performed separately for each of a set of partitions that is output by the temporal processing engine 614. In this case, the occupancy engine 616 receives data as illustrated in FIGS. 8A and 8B and performs a threshold-based processing of this data to output a set of normalised use values. For example, the normalised use values may be within a range of 0 to 1. The threshold-based processing may set at least a lower threshold and an upper threshold. Energy consumption values (e.g. as shown in the charts of FIGS. 8A and 8B) below the lower threshold may be set to 0 and energy consumption values above the upper threshold may be set to 1. Processing may be repeated for each of the set of named days within the week. One or more of the lower and upper thresholds may be based on predefined percentiles of the energy consumption values (e.g. as output in the aggregated data sets). In one case, the upper threshold may be set as an $85^{th}$ percentile for the partition (e.g., the $85^{th}$ percentile across data for the set of 7 days for each partition). In this case, the lower threshold may be set as an adjusted $5^{th}$ percentile. The adjustment may be based on a range between an upper and lower percentile. For example, the lower threshold may be determined as $P_5+0.25*(P_{95}-P_5)$ where $P_5$ and $P_{95}$ are respectively the $5^{th}$ and $95^{th}$ percentiles of energy consumption values for each partition. Values between the lower and upper thresholds may then be scaled linearly (e.g., normalised to lie on a range of between 0 and 1 by subtracting the lower threshold and then by dividing by the difference between the upper and lower thresholds). If partitioning is used, and two or more partitions are located, processing is performed per partition (i.e., on a partition-by-partition basis). The result of this threshold-based processing is a set of data for the days of the week for each partition that is scaled from 0 to 1; this is referred to as the "operational pattern". The operational pattern may then form the basis for a binary discrimination to determine occupancy. For example, a binary threshold may be applied to the operational pattern data to output values of 0 or 1 indicating unoccupied and occupied respectively. The binary threshold value may be predefined and may vary based on implementation (in tests, values within an approximate range of ~0.1 to ~0.3 were used).

In one case, the output of the occupancy engine 616 may be used as-is by one or more of the weather adjustment pre-processor 440 and the energy use disaggregator 460. In certain variations, the occupancy assignments may also be provided to a user for confirmation and/or correction. This may be performed using a user interface of the energy disaggregation system (not shown in FIG. 4). In this case, validation data 630 relating to estimated occupancy periods may be received from a user (e.g., via the user interface). The validation data 630 may indicate whether the occupancy assignments from the occupancy engine 616 are confirmed and/or whether they are to be adjusted. For example, in FIG. 8B, a user presented with visualisation data similar to chart 820 may use a user interface to change the occupied/unoccupied boundary from point 826 to point 828. This new boundary location may then be received as the validation data 630 and used by the occupancy engine 616 to update the occupancy period assignments prior to further use of the occupancy data.

In certain examples, the weather adjustment pre-processor 440 may fit two separate linear models to occupied and unoccupied periods, i.e. with those periods indicated by the occupancy data 620. For example, one or more of the regression parameters α and β may vary for each model. In one case, an unoccupied model may determine the weather-dependent component 442 using a non-piecewise model with a single β regression weight, e.g. $ELD_{WD}(i\_u)=\alpha(i\_u)+\beta_u*T(i\_u)$ whereas an occupied model may determine the weather-dependent component 442 using the piecewise model with multiple β regression weights as described above, e.g.

$$ELD_{WD}(i\_o) = \alpha(i\_o) + \sum_{k=0}^{K}\beta_k^o * T_k(i\_o)$$

(where, in both cases as described earlier above, $\alpha(i)=\alpha_j$ such that there may be fewer alpha terms than samples of energy or weather data—e.g., j may be $0 \leq j < 168$ whereas $0 \leq i < 8760$ for a year dataset with hourly sampling, with $0 \leq k < 6$). In this case, the time-based regression parameters α may be different or the same for both models and there may be K "β" regression weights. Different indexing schemes may be used depending on the time periods being processed. In other examples, the time-varying load components may also be determined using different models for occupied and unoccupied periods.

In general, one or more of the weather adjustment pre-processor 440, the baseline adjustment pre-processor 450 and the energy use disaggregator 460 may each fit one or more machine learning models to their respective input data. These machine learning models may receive additional inputs such as weather data 432, occupancy data 620, lighting schedules and building property data. Building property data may be specified in the form of a building definition file. Building property data may indicate properties such as: floor space; number of units; construction; wall and door locations; thermo-physical properties (e.g., of internal and external walls and windows); and variables (including binary flags) indicating a presence or absence of one or more environmental control systems and/or one or more categorical variables representing a particular class of installed equipment, such as lighting or power configurations. Building property data may be obtained from architecture and/or engineering plans for the building, e.g. data files defining an architectural design, one or more computer-aided design files and/or building information data files. Additionally, or alternatively, building property data may be directly measured from the building itself. In one case, the building definition file may comprise a text-based INP file for a Simplified Building Energy Model (SBEM) or an Input Data File (IDF) building model description file for an EnergyPlus model. Other formats and files may also be used. As discussed above, in certain examples, at least the building area and building type (e.g., office, warehouse, etc.) may be used to determine benchmarks or proportions for one or more of a lighting load and a small power load. In certain examples, building property data may not be needed to determine weather dependent, weather independent and baseline energy use components.

As well as the linear regression models described herein, other more complex models may also be applied. These include Fourier Series or spectral models and Gaussian process regression. In general, a raw energy load signal to be disaggregated into end-uses may be compared with information about the building in question such as building type and/or conditions in which the building is operating.

The energy disaggregation approach applied by the example systems of FIGS. 4 and 6 provides useful output when applied to energy load data for commercial (i.e. non-residential buildings). For example, the data shown in FIG. 1 is obtained from an office and the data shown in FIG. 5 is for a large commercial building. It has been found that in most cases, the assumptions underpinning most residential disaggregation algorithms are not reliable in the commercial context. For example, in a residential context it can be reasonable assumed that switch events in the data are attributable to a single appliance (a so-called "one-at-a-time assumption"). This is not the case in commercial buildings where many loads can be coming on- and offline at the same time. Also, many residential appliances draw constant loads, whereas in a commercial context there are commonly devices with variable loads, such as fans or pumps with variable speed drives. This makes many steady-state assumptions used for residential buildings impractical for commercial buildings. Individual residential building profiles may also vary greatly from one another. This means that the energy profile for each home must be "learnt" to accurately detect recurring daily or weekly patterns. In contrast, it has been found that energy profiles for commercial building types may be compared to output useful data, e.g. offices typically operate between 0800 and 1800 and so can be compared as an "office" class. This reduces the need for pattern learning on an individual commercial building basis. Finally, certain residential loads are often correlated e.g. a computer with computer monitor or televisions with streaming boxes. This correlation is often used in residential analysis to aid in disaggregation. However, in a commercial setting, it is not possible to determine if simultaneous switching events are due to correlated loads or simply more than one appliance type coming on- or offline at the same time. However, by disaggregating raw energy load data into separate components as described, it is possible to determine clear recommendations for specific methods to successfully reduce energy use in non-residential buildings. For example, different components of use may be more effectively targeted to provide double-digit percentage reductions, and many commentators indicate that there is the potential for large untapped energy use reductions in commercial buildings.

Figure 9:
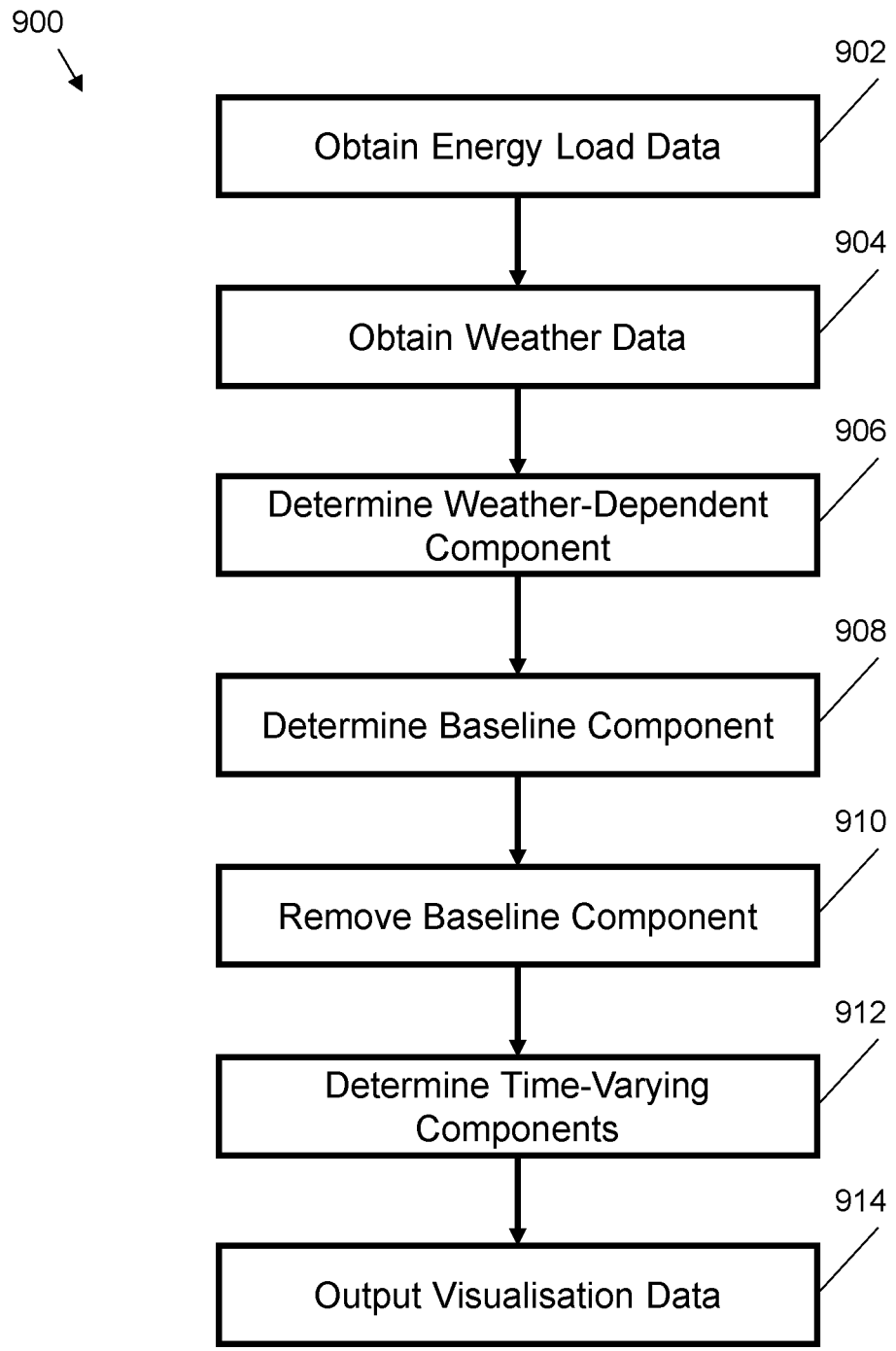
FIG. 9 is a flow diagram showing an example method for energy disaggregation for a building.

FIG. 9 shows an example of a method 900 for determining energy consumption patterns for a building. The building may comprise a non-residential building. This method 900 may be performed to implement functions similar to the example systems described above. At block 902, energy load data originating from energy use sensors for the building is obtained. As described previously, energy load data may be obtained regularly, e.g. on a push and/or pull basis, or in batches, and may be received from one or more of local and remote energy load measurement devices. The energy load data may comprise time-series energy consumption measurements for the building and may be based on periodic electrical power measurements or fuel flow measurements. At block 904, weather data for a location that includes the building is obtained. This may be obtained by querying a remote weather data server using a location of the building as a query parameter. The weather data may comprise at least an external temperature for the location. At block 906, the energy load data and the weather data are processed to determine a weather-dependent energy use component of the energy load data and a weather-independent energy use component of the energy load data. This may be performed as described for the weather adjustment pre-processor 440 of FIG. 4. At block 908, the weather-independent energy use component of the energy load data is processed to determine a baseline energy use component of the energy load data. This may be performed as described for the baseline adjustment pre-processor 450 of FIG. 4. At block 910, the baseline energy use component is removed from the weather-independent energy use component to determine a variable energy use component of the energy load data. This may be performed as shown with reference to comparator 454 in FIG. 4. The baseline energy use component may be determined as a predefined portion of the weather-independent energy use component of the energy load data. At block 912, the variable energy use component of the energy load data is processed to determine a plurality of time-varying load components of the energy load data. These may comprise any combination of one or more of: a lighting load component; a small power load component; and a miscellaneous load component. The time-varying load components may also comprise other components including a heating, ventilation and air conditioning (HVAC) load component. At block 914, visualisation data is output indicating at least the weather-dependent energy use component, the baseline energy use component and the plurality of time-varying load components. For example, block 914 may comprise outputting data to show a chart such as chart 500 of FIG. 5. This may comprise sending the visualisation data to a coupled smart meter display device for display, and/or making the visualisation data available to Internet requests from one or more client computing devices (e.g., via a web server and as shown in FIG. 3). In certain cases, the method may further comprise displaying the visualisation data on a display device. The energy load data and the weather data may comprise time-series measurements (e.g., an example of the former is shown in FIG. 1) and wherein the visualisation data comprises a plurality of time-series samples (e.g., as shown in FIG. 5).

In examples, where the time-varying load components comprises a lighting load component, the method may comprises obtaining lighting operating data for the building, and determining the lighting load component based on one or more of the lighting operating data and a lighting power density.

In certain cases, such as when using the additional energy load processor 610 of FIG. 6, the method may further comprise estimating periods of occupancy for the building using the energy load data. The estimated periods of occupancy may be used to determine different models for block 906 and/or the plurality of time-varying load components of the energy load data at block 912. For example, in the case that the time-varying load components comprises a small power load component, the method may comprise determining the small power load component based on one or more of the estimated periods of occupancy and a small power density. In certain implementations, the estimated periods of occupancy may be used to fit separate models, such as separate linear regressions, to the energy load data for occupied and un-occupied periods within a day.

In preferred examples, periods of occupancy are estimated by temporally segmenting the energy load data over a set of predefined time periods. For example, a daily average for each time within a day may be determined (e.g., either for specific named days, so as to generated multiple daily averages for the days of the week, or for all named days). An example of such an average is shown in FIGS. 8A and 8B.

In certain cases, the raw energy load data may exhibit shifts in the energy load pattern. In these cases, the method may further comprise applying a clustering model to the energy load data to determine one or more partitions within the energy load data. In these cases, the method may comprise temporally segmenting the energy load data for each partition within the partitions over a set of predefined time periods and aggregating the temporally segmented energy load data for each partition. There may be up to four partitions for a 12-month period, depending on configuration. Estimated periods of occupancy for the building may be separately determined for each partition (e.g., as shown in FIGS. 8A and 8B).

In certain examples, the method may further comprise determining a set of control actions available within the building that relate to one or more of the plurality of time-varying load components. For example, a control action related to a lighting load component may comprise turning off or turning down a set of lights; a control action related to a small power load component may comprise turning off or turning down one or more appliances or items of equipment within the building; and a control action for a heating, ventilation and air conditioning (HVAC) load component may comprise changing a desired internal temperature and opening and/or closing ventilation conduits (including windows and the like). In these cases, the method then comprises predicting a change in said one or more of the plurality of time-varying load components in response to one or more of the set of control actions. For example, the control actions may comprise switching off or changing operating parameters for appliances and/or equipment within the building. Changes may be predicted using machine learning models (e.g., deep neural networks) and/or based on historic data. In certain cases, the energy disaggregation system 410 may be configured to receive simulated energy load data from a simulated building and to output predicted time-varying load components for the simulated building, where the simulated building comprises the current building with the one or more of the control actions enacted. Recommendations for control actions that are predicted to reduce the said one or more of the plurality of time-varying load components may be output, e.g. presented to a user via a user interface. In this case, the method may further comprise receiving a selection of one or more control actions within the recommendations for control actions, and implementing the selected one or more control actions within the building, e.g. via the building services unit 310.

In certain examples, a non-transitory computer-readable storage medium may be provided storing instructions that, when executed by a processor, cause the processor to perform a series of operations. For example, the energy disaggregation system described above may comprise a processor that forms part of a computing device and/or may be coupled to one or more memory devices in a similar manner to the measurement processor 230. In one case, the processor and storage medium may form part of a system as described in any one of the previous examples. The storage medium may comprise an EPROM such as 234 or other firmware storage device. The instructions may comprise instructions to implement the method 900 of FIG. 9 and any of the variations described above.

The above examples are to be understood as illustrative of the invention. Further examples are envisaged. The various "engines" described herein may be implemented using computer program code that is processed by a hardware processor. Computer program code may be written in machine code or one or more programming languages, including, but not limited to C, C++, C#, Python, Java, Fortran, Perl, R, Ruby and Javascript. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. An energy disaggregation system for a building, comprising:
   an energy load data interface to receive energy load data originating from energy use sensors for the building;
   a weather data interface to receive weather data for a location that includes the building;
   a weather adjustment pre-processor to process the energy load data and the weather data and to determine a weather-dependent energy use component of the energy load data and a weather-independent energy use component of the energy load data;
   a baseline adjustment pre-processor to process the weather-independent energy use component of the energy load data and determine a baseline energy use component of the energy load data, wherein the baseline adjustment pre-processor is configured to remove the baseline energy use component from the weather-independent energy use component to determine a variable energy use component of the energy load data; and
   an energy use disaggregator to process the variable energy use component of the energy load data and determine a plurality of time-varying load components of the energy load data;
   the system further comprising:
   an occupancy engine to estimate periods of occupancy for the building using the energy load data wherein the energy use disaggregator uses the estimated periods of occupancy to determine the plurality of time-varying load components of the energy load data;
   a data partition engine to apply a clustering model to the energy load data to determine one or more partitions within the energy load data; and
   a temporal processing engine to segment and aggregate the energy load data over a set of predefined time periods, wherein the temporal processing engine is independently applied to the partitions determined by the data partition engine,
wherein the output of the temporal processing engine is used by the occupancy engine to estimate periods of occupancy for the building;
the system further configured to:
i) determine a set of control actions available within the building that relate to one or more of the plurality of time-varying load components;
ii) predict a change in said one or more of the plurality of time-varying load components in response to one or more of the set of control actions;
iii) output recommendations for control actions that are predicted to reduce the said one or more of the plurality of time-varying load components;
iv) receive a selection of one or more control actions within the recommendations for control actions; and
v) implement the selected one or more control actions within the building;
the one or more control actions comprising at least one of the following:
a) in relation to one or more time-varying load components, switching off or changing one or more operating parameters for one or more appliances and/or items of equipment within the building;
b) in relation to a small power load component, turning off or turning down one or more appliances or items of equipment within the building;
c) in relation to a lighting load component, turning off or turning down a set of lights;
d) in relation to a heating, ventilation and air conditioning (HVAC) load component, changing a desired internal temperature, and/or opening and/or closing ventilation conduits.

2. The system according to claim 1, wherein the energy load data comprises time-series energy consumption measurements for the building and wherein the components of the energy load data are determined for each of a plurality of time samples.

3. The system according to claim 1, wherein the baseline energy use component is determined as a predefined portion of the weather-independent energy use component of the energy load data.

4. The system according to claim 1, wherein the time-varying load components comprise one or more of:
a lighting load component;
a heating, ventilation and air conditioning (HVAC) load component;
a small power load component; and
a miscellaneous load component.

5. The system according to claim 1, wherein the time-varying load components comprises a lighting load component and system further comprises:
a lighting data interface to receive lighting operating data for the building,
wherein the energy use disaggregator determines the lighting load component based on one or more of the lighting operating data and a lighting power density.

6. The system according to claim 1, wherein the time-varying load components comprises a small power load component and the energy use disaggregator determines the small power load component based on one or more of the estimated periods of occupancy and a small power density.

7. The system according to claim 1, wherein the weather adjustment pre-processor uses the estimated periods of occupancy to fit separate linear regressions to the energy load data for occupied and un-occupied periods within a day.

8. A method for disaggregating energy use for a building, the method comprising:
obtaining energy load data originating from energy use sensors for the building;
obtaining weather data for a location that includes the building;
processing the energy load data and the weather data to determine a weather-dependent energy use component of the energy load data and a weather-independent energy use component of the energy load data;
processing the weather-independent energy use component of the energy load data to determine a baseline energy use component of the energy load data;
removing the baseline energy use component from the weather-independent energy use component to determine a variable energy use component of the energy load data;
processing the variable energy use component of the energy load data to determine a plurality of time-varying load components of the energy load data; and
outputting visualization data indicating at least the weather-dependent energy use component, the baseline energy use component and the plurality of time-varying load components;
estimating periods of occupancy for the building using the energy load data; and using the estimated periods of occupancy to determine the plurality of time-varying load components of the energy load data;
applying a clustering model to the energy load data to determine one or more partitions within the energy load data;
temporally segmenting the energy load data over a set of predefined time periods on a partition basis;
aggregating the temporally segmented energy load data on a partition basis; and
separately determining estimated periods of occupancy for the building for each partition;
determining a set of control actions available within the building that relate to one or more of the plurality of time-varying load components;
predicting a change in said one or more of the plurality of time-varying load components in response to one or more of the set of control actions;
outputting recommendations for control actions that are predicted to reduce the said one or more of the plurality of time-varying load components;
receiving a selection of one or more control actions within the recommendations for control actions; and
implementing the selected one or more control actions within the building,
the one or more control actions comprising at least one of the following:
a) in relation to one or more time-varying load components, switching off or changing one or more operating parameters for one or more appliances and/or items of equipment within the building;
b) in relation to a small power load component, turning off or turning down one or more appliances or items of equipment within the building;
c) in relation to a lighting load component, turning off or turning down a set of lights;
d) in relation to a heating, ventilation and air conditioning (HVAC) load component, changing a desired internal temperature, and/or opening and/or closing ventilation conduits.

9. The method according to claim 8, the energy load data and the weather data comprise time-series measurements and wherein the visualisation data comprises a plurality of time-series samples, the method further comprising displaying the visualisation data on a display device.

10. The method according to claim 8, wherein the baseline energy use component is determined as a predefined portion of the weather-independent energy use component of the energy load data.

11. The method according to claim 8, wherein the time-varying load components comprise one or more of:
   a lighting load component;
   a heating, ventilation and air conditioning (HVAC) load component;
   a small power load component; and
   a miscellaneous load component.

12. The method according to claim 8, wherein the time-varying load components comprises a lighting load component and the method comprises:
   obtaining lighting operating data for the building; and
   determining the lighting load component based on one or more of the lighting operating data and a lighting power density.

13. The method according to claim 8, wherein the time-varying load components comprises a small power load component and the method comprises:
   determining the small power load component based on one or more of the estimated periods of occupancy and a small power density.

14. The method according to claim 8, comprising:
   using the estimated periods of occupancy to fit separate linear regressions to the energy load data for occupied and un-occupied periods within a day.

15. A non-transitory computer-readable storage medium storing instructions that, when executed by a processor, cause the processor to perform the method of claim 8.

* * * * *